(12) United States Patent
Hakiai et al.

(10) Patent No.: US 9,376,097 B2
(45) Date of Patent: Jun. 28, 2016

(54) VEHICLE BRAKE DEVICE AND METHOD OF CONTROLLING THE SAME

(75) Inventors: Motomu Hakiai, Yokohama (JP); Yoshiyasu Takasaki, Saitama (JP)

(73) Assignee: Bosch Corporation, Tokyo (JP)

(*) Notice: Subject to any disclaimer, the term of this patent is extended or adjusted under 35 U.S.C. 154(b) by 215 days.

(21) Appl. No.: 13/703,959

(22) PCT Filed: Oct. 5, 2011

(86) PCT No.: PCT/JP2011/072956
§ 371 (c)(1),
(2), (4) Date: Feb. 7, 2013

(87) PCT Pub. No.: WO2012/086290
PCT Pub. Date: Jun. 28, 2012

(65) Prior Publication Data
US 2013/0127236 A1 May 23, 2013

(30) Foreign Application Priority Data
Dec. 20, 2010 (JP) .................................. 2010-283213

(51) Int. Cl.
*B60L 7/18* (2006.01)
*B60T 13/58* (2006.01)
(Continued)

(52) U.S. Cl.
CPC .................. *B60T 13/586* (2013.01); *B60L 7/18* (2013.01); *B60L 7/26* (2013.01); *B60T 7/042* (2013.01);
(Continued)

(58) Field of Classification Search
CPC ....... B60T 1/10; B60T 13/586; B60T 8/3655; B60T 13/686; B60L 7/26; B60L 7/18
USPC ................................................. 303/151, 152
See application file for complete search history.

(56) References Cited

U.S. PATENT DOCUMENTS 6,149,247 A * 11/2000 Hofmann et al. .......... 303/113.4
6,354,672 B1 * 3/2002 Nakamura et al. ......... 303/113.1
(Continued)

FOREIGN PATENT DOCUMENTS

| JP | 2002356156 | 12/2002 | |
|----|------------|---------|---|
| JP | 2006137221 A | * 6/2006 | ................ B60T 8/34 |
| JP | 2006264675 | 10/2006 | |
| JP | 2007500104 | 1/2007 | |
| JP | 2008290487 | 12/2008 | |

OTHER PUBLICATIONS

International Search Report for Application No. PCT/JP2011/072956 dated Dec. 20, 2011 (1 page).

*Primary Examiner* — Thomas Irvin
(74) *Attorney, Agent, or Firm* — Michael Best & Friedrich LLP

(57) ABSTRACT

An object of the invention is to prevent abnormal noise from being generated when the pressure of brake fluid supplied to a brake caliper is reduced.
A vehicle brake device includes first and second hydraulic brakes generating a hydraulic brake force and a regenerative brake generating a regenerative brake force and divides a braking force into the hydraulic brake force and the regenerative brake force. The vehicle brake device includes a regulating valve that is provided between the first and second hydraulic brakes and continuously regulates the flow rate of brake fluid flowing to the second hydraulic brake from the first hydraulic brake, and a pressure reducing valve that reduces the pressure of the brake fluid supplied to the second hydraulic brake. An opening of the regulating valve is continuously increased and the pressure reducing valve is opened, when the hydraulic brake force of the first hydraulic brake is reduced.

6 Claims, 4 Drawing Sheets

(51) Int. Cl.
*B60T 7/04* (2006.01)
*B60T 13/66* (2006.01)
*B60T 13/68* (2006.01)
*B60T 17/04* (2006.01)
*B60T 17/22* (2006.01)
*B60L 7/26* (2006.01)
*B60T 8/48* (2006.01)
*B60T 8/36* (2006.01)

(52) U.S. Cl.
CPC ............. *B60T 8/4872* (2013.01); *B60T 13/662* (2013.01); *B60T 13/686* (2013.01); *B60T 17/04* (2013.01); *B60T 17/221* (2013.01); *B60T 8/3655* (2013.01); *B60T 2270/604* (2013.01)

(56) References Cited

U.S. PATENT DOCUMENTS

| | | | | |
|---|---|---|---|---|
| 6,957,870 | B2* | 10/2005 | Kagawa et al. | 303/113.4 |
| 8,123,310 | B2* | 2/2012 | Haupt et al. | 303/152 |
| 8,414,089 | B2* | 4/2013 | Feigel et al. | 303/113.1 |
| 8,781,701 | B2* | 7/2014 | Aoki et al. | 701/70 |
| 8,857,922 | B2* | 10/2014 | Dinkel | 303/10 |
| 2006/0125317 | A1* | 6/2006 | Kokubo et al. | 303/152 |
| 2007/0296264 | A1* | 12/2007 | Haupt et al. | 303/3 |
| 2008/0228367 | A1* | 9/2008 | Aoki et al. | 701/70 |
| 2013/0134767 | A1* | 5/2013 | Hakiai et al. | 303/3 |

* cited by examiner (A)

(B)

(C)

VEHICLE BRAKE DEVICE AND METHOD OF CONTROLLING THE SAME

CROSS REFERENCE TO RELATED APPLICATIONS

This application is a national phase application of PCT Application No. PCT/JP2011/072956, filed Oct. 5, 2011 which claims priority to Japanese Patent Application No. 283213/2010, filed Dec. 20, 2010, the entire contents of which are hereby incorporated by reference therein.

BACKGROUND OF THE INVENTION

The present invention relates to a vehicle brake device and a method of controlling the vehicle brake device, and more particularly, to a vehicle brake device that includes hydraulic brakes and a regenerative brake generating a regenerative brake force and divides a braking force into a hydraulic brake force and a regenerative brake force.

In the past, a vehicle brake device, which includes a hydraulic brake generating a hydraulic brake force by using hydraulic pressure generated according to the driver's operation of a brake and a regenerative brake generating a regenerative brake force and performs regenerative cooperation by dividing a braking force into the hydraulic brake force and the regenerative brake force, has been known as a vehicle brake device.

An object of a regenerative brake, which is used in this kind of vehicle brake device, is to convert the kinetic energy of the wheels during braking into electric energy and to use energy effectively. However, the maximum regenerative brake force which can be regenerated by the regenerative brake, has a limitation due to the speed of a vehicle during braking, the charge state of a battery, or the like. For this reason, even in terms of the effective use of energy, it is preferable that a ratio of the regenerative brake be increased by the change of a ratio between a braking force which is generated by the hydraulic brake, and a braking force which is generated by the regenerative brake, according to the maximum regenerative brake force even while the hydraulic brake is performing braking.

In order to achieve this, various methods of performing regenerative cooperation have been proposed. However, when a ratio of the regenerative brake in terms of a braking force is changed, a driver might feel a sense of discomfort in the brake feeling. For this reason, as means for obtaining a comfortable brake feeling, there is a vehicle brake device that makes brake fluid escape into a low pressure accumulator through a pressure reducing valve when performing braking using a regenerative brake and pumps brake fluid from the accumulator using a motor pump unit, which is electrically controlled, when increasing hydraulic pressure (for example, see Patent Document 1).

CITATION LIST

Patent Literature

[PTL 1] JP-T-2007-500104

SUMMARY OF THE INVENTION

However, since the pressure reducing valve can only be opened fully or closed fully in the above-mentioned vehicle brake device that makes brake fluid, which is supplied to a brake caliper, escape into a low pressure accumulator through the pressure reducing valve, the pressure reducing valve regulates the amount of discharged brake fluid by the repetition of the opening and closing thereof. At this time, pulsation occurs in the brake fluid. Particularly, when a difference in the hydraulic pressure of the brake fluid before and behind the pressure reducing valve is large, there is a concern that abnormal noise caused by water hammer or the like is generated.

An object of the invention is to solve the above-mentioned problem in the related art and to prevent abnormal noise from being generated when the pressure of brake fluid supplied to a brake caliper is reduced.

According to the invention, there is provided a vehicle brake device that includes first and second hydraulic brakes generating a hydraulic brake force and a regenerative brake generating a regenerative brake force and divides a braking force into the hydraulic brake force and the regenerative brake force. The vehicle brake device includes a regulating valve that is provided between the first and second hydraulic brakes and continuously regulates the flow rate of brake fluid flowing to the second hydraulic brake from the first hydraulic brake, and a pressure reducing valve that reduces the pressure of the brake fluid supplied to the second hydraulic brake. An opening of the regulating valve is continuously increased and the pressure reducing valve is opened, when the hydraulic brake force of the first hydraulic brake is reduced.

In this case, the second hydraulic brake may not generate a braking force when the hydraulic brake force of the first hydraulic brake is reduced. The pressure reducing valve may be a solenoid valve that is intermittently opened and closed, and may be maintained open when the hydraulic brake force of the first hydraulic brake is reduced. The vehicle brake device may include another pressure reducing valve that reduces the pressure of brake fluid supplied to the first hydraulic brake, and the another pressure reducing valve may be maintained closed when the regenerative brake force is to be increased. The pressure reducing valve of the second hydraulic brake may supply the brake fluid, which is supplied to the second hydraulic brake, to an accumulator when reducing the pressure of the brake fluid supplied to the second hydraulic brake.

Further, according to the invention, there is provided a method of controlling a vehicle brake device that includes first and second hydraulic brakes generating a hydraulic brake force, a regenerative brake generating a regenerative brake force, a regulating valve provided between the first and second hydraulic brakes and continuously regulating the flow rate of brake fluid flowing to the second hydraulic brake from the first hydraulic brake, and a pressure reducing valve reducing the pressure of the brake fluid supplied to the second hydraulic brake, and divides a braking force into the hydraulic brake force and the regenerative brake force. The method includes a step of continuously increasing an opening of the regulating valve and a step of opening the pressure reducing valve, when reducing the hydraulic brake force of the first hydraulic brake.

In this case, the second hydraulic brake may not generate a braking force when the hydraulic brake force of the first hydraulic brake is reduced. The pressure reducing valve may be a solenoid valve that is intermittently opened and closed, and may be maintained open when the hydraulic brake force of the first hydraulic brake is reduced. The vehicle brake device may include another pressure reducing valve that reduces the pressure of brake fluid supplied to the first hydraulic brake, and the another pressure reducing valve may be maintained closed when the regenerative brake force is to be increased. The pressure reducing valve of the second hydraulic brake may supply the brake fluid, which is supplied to the second hydraulic brake, to an accumulator when reducing the pressure of the brake fluid supplied to the second hydraulic brake.

In the invention, it is possible to prevent abnormal noise from being generated when the pressure of brake fluid supplied to a brake caliper is reduced.

DETAILED DESCRIPTION

Preferred embodiments of the invention will be described below with reference to the drawings.

Figure 1:
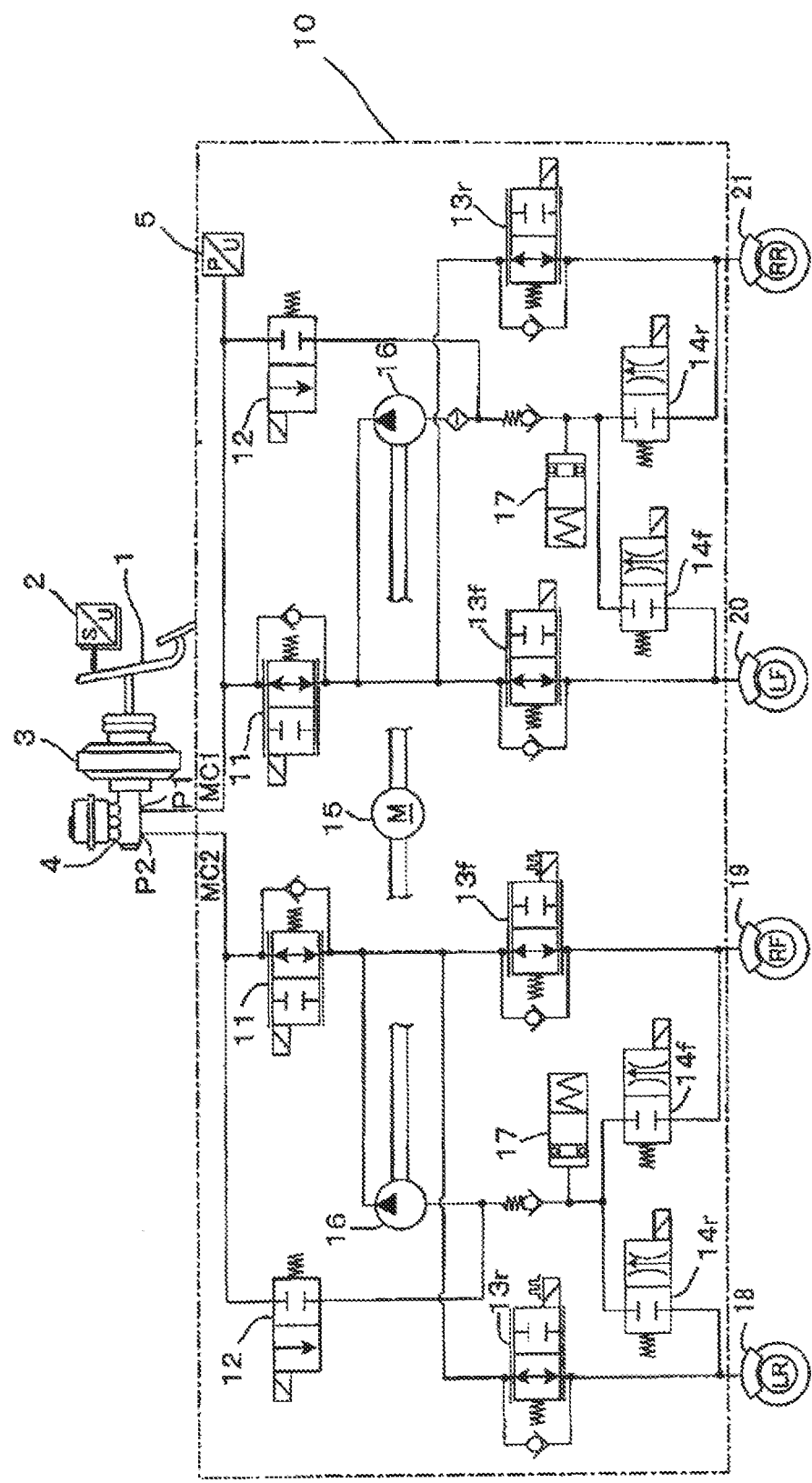
FIG. 1 is a view showing an example of a hydraulic circuit of a vehicle brake device according to an embodiment of the invention.

FIG. 1 shows an example of a hydraulic circuit 10, which forms a hydraulic brake, of a vehicle brake device to which the invention is applied. As shown in FIG. 1, this embodiment is applied to a so-called X-pipe type hydraulic circuit that includes two brake lines and brakes one front wheel and a rear wheel provided at a position diagonal to the front wheel as a pair on each line. Further, the invention can be widely applied to vehicles that include not only four-wheeled vehicles but also two-wheeled vehicles.

The invention is applied to a vehicle brake device that includes a regenerative brake and a hydraulic brake and divides a braking force into a hydraulic brake force and a regenerative brake force for a driver-requested brake force. Accordingly, although not shown, a wheel driving motor, which functions as a wheel driving source during traveling and functions as a generator during braking to generate a regenerative brake force, is mounted on a vehicle, which is an object to be controlled, as a regenerative brake and a brake ECU and a power train ECU for controlling this motor are electrically connected to each other. The brake ECU controls the regenerative brake force by giving a regenerative brake command value to the power train ECU, and the power train ECU outputs the maximum value of a regenerative brake force, which can be output at that time, to the brake ECU.

Inputs are further given to the brake ECU from wheel speed sensors (not shown) that detect the speeds of the respective wheels (RF, LR, LF, and RR), and the like other than a stroke sensor 2 that is mounted on a brake pedal 1 and a master cylinder hydraulic pressure sensor 5 that detects hydraulic pressure in a master cylinder 4.

In the hydraulic circuit 10 shown in FIG. 1, a pressing force applied to the brake pedal 1 is amplified by a booster 3 and transmitted to the master cylinder 4 functioning as a hydraulic pressure generating source. Two pressurizing chambers defined by primary and secondary pistons (not shown) are formed in the master cylinder 4.

The respective pistons are pressed according to the operation of the brake pedal, so that brake fluid flows into the hydraulic circuit 10 through hydraulic pressure ports P1 and P2 communicating with the respective pressurizing chambers. Further, the booster 3 is a pneumatic booster in the related art, and is connected to the brake pedal 1 by an input rod (not shown). The amplified pressing force is transmitted to the master cylinder 4 through a pushrod (not shown) connected to the primary piston. Further, like a booster in the related art, the booster 3 has so-called jump-in characteristics. Accordingly, a predetermined gap (in other words, a jump-in area) is formed between the input rod and a reaction disc mounted on the pushrod so that an area where reaction is very small until the input rod of the booster 3 is mechanically connected to the pushrod of the master cylinder 4 is formed.

Brake pipe lines MC1 and MC2 extend from the hydraulic pressure ports P1 and P2 of the master cylinder 4 toward wheel cylinders of the respective wheels (RF, LR, LF, and RR). As described above, the hydraulic circuit of the brake device of this embodiment is an X-pipe type hydraulic circuit. In the example of FIG. 1, the hydraulic circuit 10 is configured so that brake fluid is supplied to a wheel cylinder of a right front wheel (RF)-hydraulic brake (first hydraulic brake) 19 and a wheel cylinder of a left rear wheel (LR)-hydraulic brake (second hydraulic brake) 18 through the brake pipe line MC2 and brake fluid is supplied to a wheel cylinder of a left front wheel (LF)-hydraulic brake (first hydraulic brake) 20 and a wheel cylinder of a right rear wheel (RR)-hydraulic brake (second hydraulic brake) 21 through the brake pipe line MC1. Accordingly, each of the brakes 18, 19, 20, and 21 is adapted so as to be capable of generating a braking force on the wheel by the operation of the wheel cylinder that is caused by hydraulic pressure.

The hydraulic circuit of each line includes a circuit control valve 11 that is a normally open type and can be linearly controlled, an inlet valve 12 that is a normally closed type and is on/off controlled, pressure booster valves 13$f$ and 13$r$ that are normally open types and can be linearly controlled, and pressure reducing valves 14$f$ and 14$r$ that are normally closed types and are on/off controlled, as electromagnetic valves. The hydraulic circuit further includes a pump 16 that is driven by a pump motor 15, and a low pressure accumulator 17. The pressure booster valve 13$f$ and the pressure reducing valve 14$f$, which are provided adjacent to the right front wheel-hydraulic brake 19, are used in the ABS control of the right front wheel-hydraulic brake 19. The pressure booster valve (regulating valve) 13$r$ and the pressure reducing valve 14$r$, which are provided adjacent to the left rear wheel-hydraulic brake 18, are used in the ABS control of the right rear wheel-hydraulic brake 18.

The pressure booster valve 13$f$ corresponding to the right front wheel is provided between the right front wheel-hydraulic brake 19 and the master cylinder 4 and the circuit control valve 11. The pressure booster valve 13$f$, which can be linearly controlled, is adapted to be capable of continuously regulating the flow rate of brake fluid that flows to the wheel cylinder of the right front wheel-hydraulic brake 19 from the master cylinder 4 and the circuit control valve 11. The pressure booster valve 13$f$ includes a bypass flow passage provided with a check valve through which brake fluid flows to the master cylinder 4 and the circuit control valve 11 from the right front wheel-hydraulic brake 19 but does not flow in a reverse direction when the pressure booster valve 13$f$ is closed.

The pressure reducing valve 14$f$ corresponding to the right front wheel is a solenoid valve that can only be opened fully or closed fully, and is provided between the wheel cylinder of the right front wheel-hydraulic brake 19 and the low pressure accumulator 17. The pressure reducing valve 14$f$ is adapted so as to be capable of reducing the pressure of brake fluid that is supplied to the wheel cylinder of the right front wheel-hydraulic brake 19 when being opened. Meanwhile, the pressure reducing valve 14$f$ can regulate the flow rate of brake fluid, which flows to the low pressure accumulator 17 from the wheel cylinder of the right front wheel-hydraulic brake 19, by intermittently repeating the opening and closing of the valve.

The pressure booster valve 13r corresponding to the left rear wheel is provided between the wheel cylinder of the left rear wheel-hydraulic brake 18 and the master cylinder 4, the circuit control valve 11, the pressure booster valve 13f, and the wheel cylinder of the right front wheel-hydraulic brake 19. The pressure booster valve 13r, which can be linearly controlled, is adapted to be capable of continuously regulating the flow rate of brake fluid that flows to the wheel cylinder of the left rear wheel-hydraulic brake 18 from the master cylinder 4, the circuit control valve 11, the pressure booster valve 13f, and the wheel cylinder of the right front wheel-hydraulic brake 19. The pressure booster valve 13r includes a bypass flow passage provided with a check valve through which brake fluid flows to the left rear wheel-hydraulic brake 19 from the left rear wheel-hydraulic brake 18 but does not flow in a reverse direction when the pressure booster valve 13r is closed.

The pressure reducing valve 14r corresponding to the left rear wheel is a solenoid valve that can only be opened fully or closed fully, and is provided between the wheel cylinder of the left rear wheel-hydraulic brake 18 and the low pressure accumulator 17. The pressure reducing valve 14r is adapted so as to be capable of reducing the pressure of brake fluid that is supplied to the wheel cylinder of the left rear wheel-hydraulic brake 18 when being opened, by supplying the brake fluid to the accumulator 17. Meanwhile, the pressure reducing valve 14r can regulate the flow rate of brake fluid, which flows to the low pressure accumulator 17 from the wheel cylinder of the left rear wheel-hydraulic brake 18, by intermittently repeating the opening and closing of the valve.

The circuit control valve 11 is provided so as to make the pressure booster valves 13f and 13r and the master cylinder 4 communicate with each other or interrupt the communication therebetween, and the inlet valve 12 is provided so as to make the master cylinder 4 and the suction side of the pump 16 communicate with each other or interrupt the communication therebetween. Since these are the same as the components for electronic stability control (ESC) in the related art, the detailed description thereof will be omitted. Further, the above-mentioned master cylinder hydraulic pressure sensor 5 is disposed on one brake pipe line (the brake pipe line MC1 in the example of FIG. 1).

Figure 2:
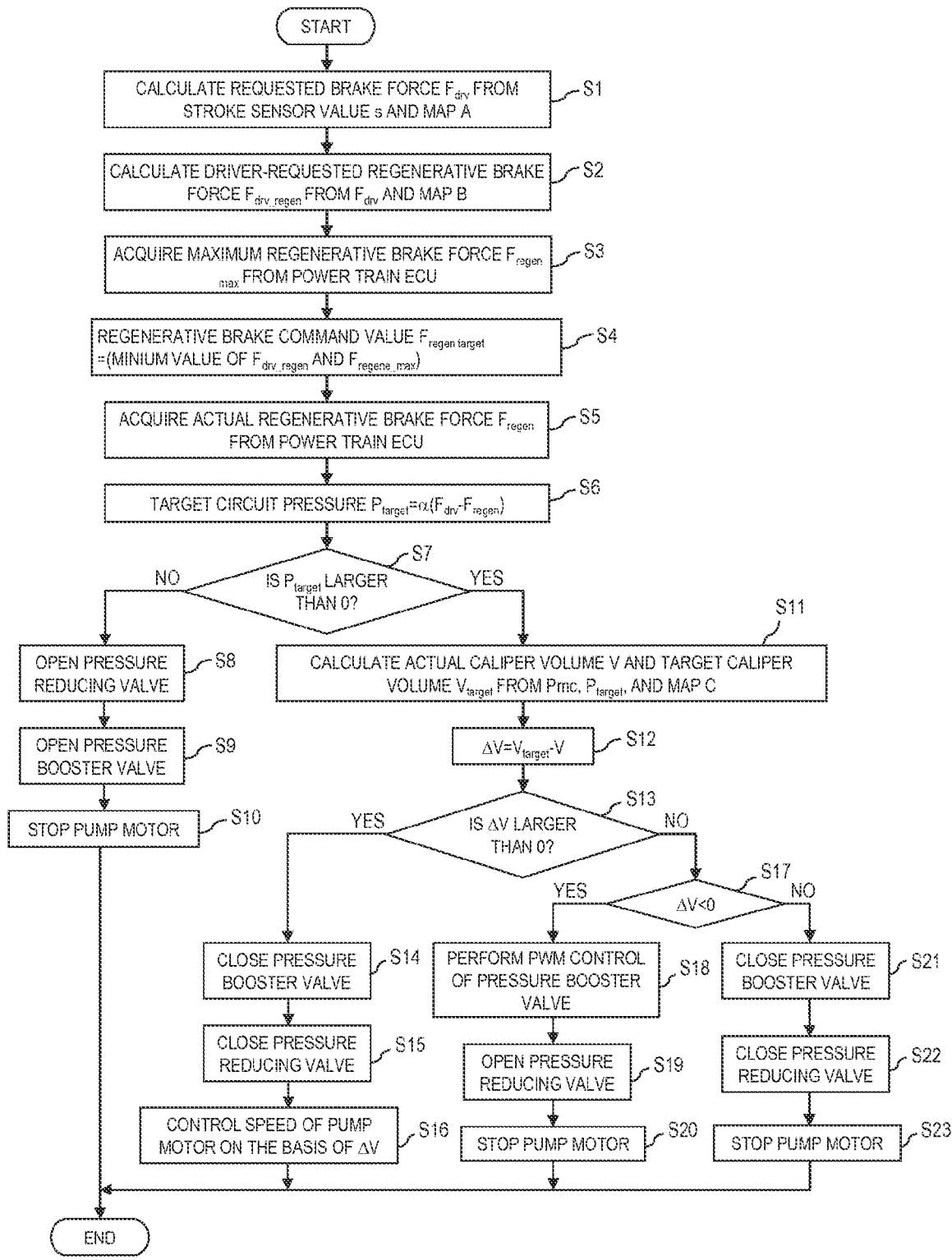
FIG. 2 is a flow chart illustrating an example of processing in a brake ECU.

An example of processing that is performed by the brake ECU of the vehicle brake device is illustrated in a flow chart of FIG. 2. The vehicle brake device according to this embodiment can appropriately control the braking forces of the right front wheel-hydraulic brake 19 and the left front wheel-hydraulic brake 20 according to the variation of the maximum regenerative brake force, which can be regenerated by the regenerative brake, by performing the following processing. Meanwhile, the left rear wheel-hydraulic brake 18 and the right rear wheel-hydraulic brake 21 do not generate a braking force in the following processing. Only the right front wheel-hydraulic brake 19 and the left rear wheel-hydraulic brake 18 will be described in this embodiment, but the left front wheel-hydraulic brake 20 and the right rear wheel-hydraulic brake 21 are also controlled in the same manner.

First, the brake ECU calculates a driver-requested brake force $F_{drv}$, which represents a target braking force corresponding to the operation performed by a driver, on the basis of a stroke sensor value s of the stroke sensor 2 that is mounted on the brake pedal 1. A map A shown in FIG. 3A, in which a corresponding relationship between the stroke sensor value s and the driver-requested brake force $F_{drv}$ has been set in advance, is stored in the brake ECU in order to be used in this calculation. Accordingly, the brake ECU calculates the driver-requested brake force $F_{drv}$, which is a target braking force, from the stroke sensor value s and the map A (Step S1).

Figure 3:
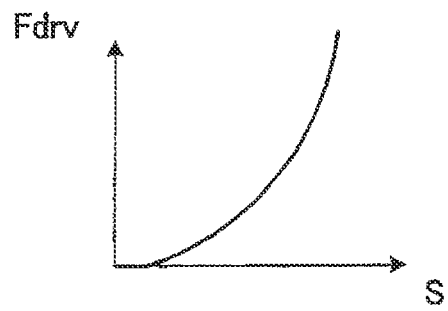
FIG. 3 is a view showing examples of maps that are used in the processing of FIG. 2.
Figure 3:
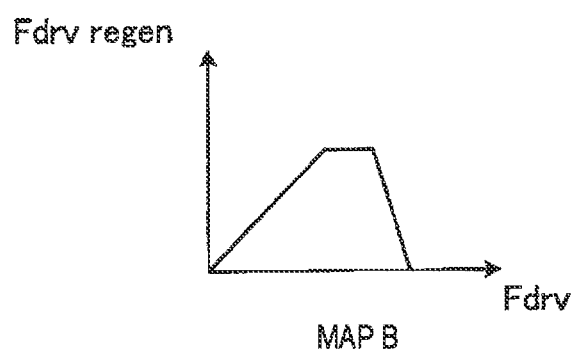
Figure 3:
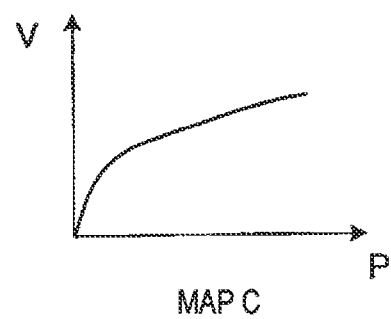

After calculating the driver-requested brake force $F_{drv}$, the brake ECU calculates a driver-requested regenerative brake force $F_{drv\_regen}$ as a target regenerative braking force to be distributed for the driver-requested brake force $F_{drv}$ (Step S2). For example, a map B shown in FIG. 3B is stored in the brake ECU in order to be used in this calculation. A corresponding relationship between the driver-requested brake force $F_{drv}$ and the driver-requested regenerative brake force $F_{drv\_regen}$ is set in the map B. In this embodiment, the driver-requested regenerative brake force $F_{drv\_regen}$ for a driver-requested brake force $F_{drv}$ having a predetermined value is set to zero as shown in FIG. 3B.

After calculating the driver-requested regenerative brake force $F_{drv\_regen}$, the brake ECU acquires the maximum regenerative brake force $F_{regen\_max}$ that is obtained from the power train ECU and is the maximum value of a regenerative brake force that can be output at the present time (Step S3).

After acquiring the maximum regenerative brake force $F_{regen\_max}$, the brake ECU compares the maximum regenerative brake force $F_{regen\_max}$, which is acquired in Step S3, with the driver-requested regenerative brake force $F_{drv\_regen}$ that is calculated in Step S2, and outputs the smaller value of the two to the power train ECU as a regenerative brake command value $F_{regen\_target}$ (Step S4).

After outputting the regenerative brake command value $F_{regen\_target}$ to the power train ECU, the brake ECU acquires an actual regenerative brake force $F_{regen}$, which corresponds to a current actual regenerative brake force at the present, from the power train ECU (Step S5).

After acquiring the actual regenerative brake force $F_{regen}$, the brake ECU calculates target circuit pressure $P_{target}$ on the basis of predetermined calculation "$P_{target} = \alpha(F_{drv} - F_{regen})$" so that a hydraulic brake force to be distributed for the driver-requested brake force $F_{drv}$ is obtained (Step S6). Meanwhile, α denotes a constant that is used to convert a brake force into pressure.

After calculating the target circuit pressure $P_{target}$, the brake ECU determines whether the calculated target circuit pressure $P_{target}$ is positive (Step S7). By this processing, the brake ECU can determine whether a requested brake force based on the driver's operation of a brake is satisfied by the regenerative brake alone.

If determining that the target circuit pressure $P_{target}$ is not positive in Step S7 (NO in Step S7), the brake ECU opens the pressure reducing valve 14r corresponding to the left rear wheel (Step S8), opens the pressure booster valve 13r corresponding to the left rear wheel (Step S9), and stops the pump motor 15 (Step S10), thereby ending a series of processing. When a requested brake force is satisfied by the regenerative brake alone, the brake ECU can make the right front wheel-hydraulic brake 19 not generate a braking force by the processing of Steps S8 to S10.

Meanwhile, if determining that the target circuit pressure $P_{target}$ is positive in Step S7 (YES in Step S7), the brake ECU calculates actual caliper volume V (the volume of brake fluid in the wheel cylinders of a caliper at the present time) and target caliper volume $V_{target}$ (the volume of brake fluid in the wheel cylinders of the caliper, which is required to obtain the e circuit pressure $P_{target}$), on the basis of master cylinder sensor hydraulic pressure Pmc detected by the master cylinder hydraulic pressure sensor 5, target circuit pressure $P_{target}$, and a map C shown in FIG. 3C (Step S11). The map C shown in FIG. 3C, in which a relationship between pressure P and caliper volume V has been set, is stored in the brake ECU in order to be used in this calculation.

After calculating the actual caliper volume V and the target caliper volume $V_{target}$, the brake ECU calculates a difference $\Delta V$ between the target caliper volume $V_{target}$ and the actual caliper volume V on the basis of predetermined calculation "$\Delta V = V_{target} - V$" (Step S12).

After calculating $\Delta V$, the brake ECU determines whether $\Delta V$ is positive (Step S13).

If determining that $\Delta V$ is positive in Step S13 (YES in Step S13), the brake ECU closes the pressure booster valve 13r corresponding to the left rear wheel (Step S14), closes the pressure reducing valve 14r corresponding to the left rear wheel (Step S15), and operates the motor 15 by controlling the speed of the pump motor 15 (Step S16), thereby ending a series of processing. The speed of the motor 15 at this time is determined on the basis of a value of $\Delta V$.

Meanwhile, if determining that $\Delta V$ is not positive in Step S13 (NO in Step S13), the brake ECU determines whether $\Delta V$ is negative (Step S17).

If determining that $\Delta V$ is negative in Step S17 (YES in Step S17), the brake ECU starts to continuously and gradually increase the opening of the pressure booster valve 13r corresponding to the left rear wheel by PWM control (Step S18). When starting to gradually increase the opening of the pressure booster valve 13r corresponding to the left rear wheel, the brake ECU opens the pressure reducing valve 14r corresponding to the left rear wheel (Step S19) and stops the pump motor 15 (Step S20), thereby ending a series of processing. Accordingly, since the pressure reducing valve 14r corresponding to the left rear wheel is maintained open and the pressure reducing valve 14f corresponding to the right front wheel is maintained closed, the reduction of the pressure of the brake fluid supplied to the wheel cylinder of the right front wheel-hydraulic brake 19 is regulated by the pressure booster valve 13r corresponding to the left rear wheel. When increasing a regenerative brake force while the right front wheel-hydraulic brake 19 is generating a hydraulic brake force, the brake ECU can continuously and gradually reduce the hydraulic pressure of the brake fluid, which is supplied to the wheel cylinder of the right front wheel-hydraulic brake 19, by the processing of Steps S18 to S20.

Meanwhile, if determining that $\Delta V$ is not negative in Step S17 (NO in Step S17), the brake ECU closes the pressure booster valve 13r corresponding to the left rear wheel (Step S21), closes the pressure reducing valve 14r corresponding to the left rear wheel (Step S22), and stops the pump motor 15 (Step S23), thereby ending a series of processing. The brake ECU can keep the braking force of the right front wheel-hydraulic brake 19 by the processing of Steps S21 to S23 when $\Delta V$ is 0 (zero), that is, when the target caliper volume $V_{target}$ and the actual caliper volume V are equal to each other.

The brake ECU repeats the above-mentioned processing at a predetermined time interval. During this time, the pressure booster valve 13f corresponding to the right front wheel is always maintained open.

In this embodiment, the brake ECU continuously and gradually increases the openings of the pressure booster valves 13r and 13r corresponding to the rear wheels and opens the pressure reducing valves 14r and 14r corresponding to the rear wheels when reducing the braking forces of the front wheel-hydraulic brakes 19 and 20. Accordingly, it is not necessary to open and close the pressure reducing valves 14f and 14f corresponding to the front wheels when reducing the pressure of the brake fluid supplied to the wheel cylinders of the front wheel-hydraulic brakes 19 and 20 so as to cope with the variation of the maximum regenerative brake force, which varies due to the speed of a vehicle, the charge state of a battery, or the like when braking the vehicle, such as when increasing a regenerative brake force while generating a hydraulic brake force by braking the front wheel-hydraulic brakes 19 and 20. For this reason, it is possible to prevent abnormal noise, which is caused by the opening and closing of the pressure reducing valves 14f and 14f corresponding to the front wheels, from being generated.

Figure 4:
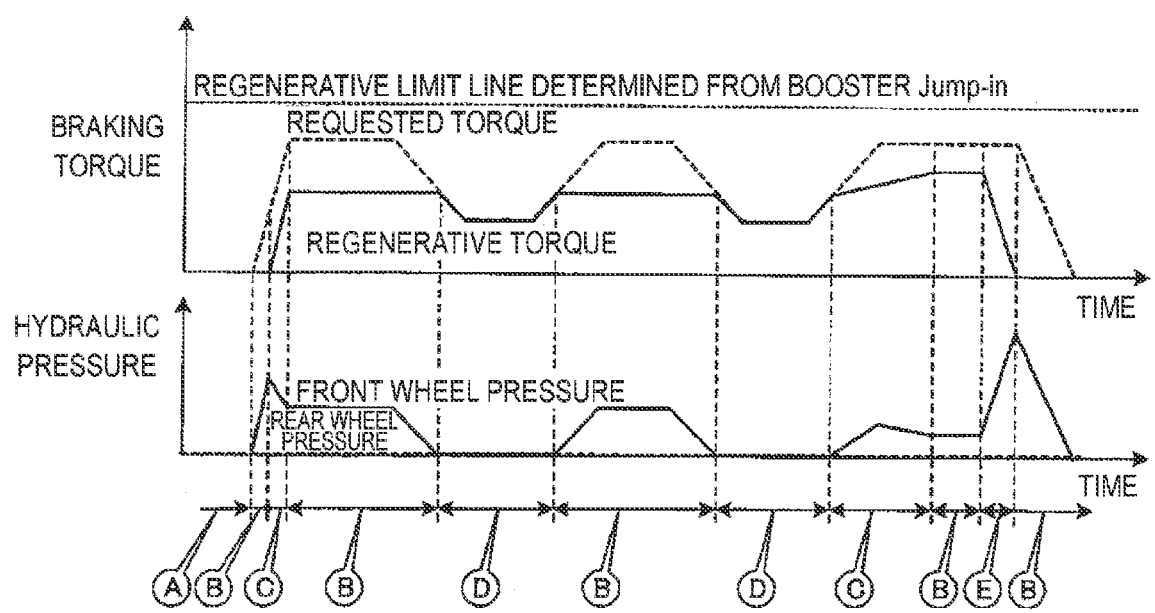
FIG. 4 is a timing chart illustrating an example of control when the maximum regenerative brake force is increased.

FIG. 4 is a view showing an example of a timing chart when the maximum regenerative brake force is increased during braking.

Meanwhile, unless otherwise specifically noted in FIG. 4 and the following description, "maximum regenerative brake force" means the maximum value of the regenerative brake force that is input to the brake ECU from the power train ECU and can be output at the present time. As described above, the maximum regenerative brake force is changed during braking according to the speed of a vehicle, the charge state of a battery, or the like.

In a graph of braking torque against time in FIG. 4, a regenerative brake force (corresponding to a regenerative brake command value $F_{regen}$) is shown as regenerative torque by a solid line and a driver-requested brake force $F_{drv}$ is shown as requested torque by a broken line. Meanwhile, in a graph of the hydraulic pressure of a brake against time, front wheel pressure is shown by a solid line and rear wheel pressure is shown by a broken line.

While the driver-requested brake force $F_{drv}$ is covered by the regenerative brake force alone as shown at the first area D in FIG. 4, the pressure reducing valves 14 are opened. Specifically, in the area D, the driver-requested brake force $F_{drv}$ caused by the pressing of the pedal is increased while the hydraulic brake force is zero. At this time, the driver-requested regenerative brake force $F_{drv\ regen}$ is also increased on the basis of the map B. Until the driver-requested regenerative brake force $F_{drv\ regen}$ becomes larger than the maximum regenerative brake force so that the target circuit pressure $P_{target}$ becomes positive, the pressure reducing valves 14r corresponding to the rear wheels are maintained open. Accordingly, brake fluid corresponding to the operation amount of the pedal is discharged to the low pressure accumulator 17.

When the driver-requested regenerative brake force $F_{drv\ regen}$ becomes larger than the maximum regenerative brake force and the driver-requested brake force $F_{drv}$ cannot be covered by the regenerative brake force alone (the target circuit pressure $P_{target}$ is positive), the pressure reducing valves 14r corresponding to the rear wheels are closed and a hydraulic brake force corresponding to the operation amount of the pedal is generated (area B). At this time, when the driver-requested regenerative brake force $F_{drv\ regen}$ is reduced to the maximum regenerative brake force again, the pressure reducing valves 14r corresponding to the rear wheels are maintained open. Accordingly, brake fluid corresponding to the operation amount of the pedal is discharged to the low pressure accumulator 17 (area D).

When the maximum regenerative brake force starts to increase, a difference $\Delta V$ between the target caliper volume $V_{target}$ and the actual caliper volume V is negative. Accordingly, the openings of the pressure booster valves 13r corresponding to the rear wheels are continuously and gradually increased by PWM control and the pressure reducing valves 14r corresponding to the rear wheels are opened (area C). According to this embodiment, when the brake pressure corresponding to the front wheels is reduced, the pressure reducing valves 14f corresponding to the front wheels are not opened and the pressure booster valves 13r corresponding to the rear wheels are continuously and gradually increased as described above. Accordingly, it is possible to avoid problems of vibration and noise when the pressure reducing valves are opened under pressure.

When the maximum regenerative brake force is not increased, the pressure booster valves 13r corresponding to the rear wheels and the pressure reducing valves 14r corresponding to the rear wheels are maintained closed (area B).

When the maximum regenerative brake force starts to be reduced, the hydraulic pressure of the brake fluid in the wheel cylinders of the front wheel-hydraulic brakes 19 and 20 are increased by the operation of the pump 16 while the pressure booster valves 13r corresponding to the rear wheels and the pressure reducing valves 14r corresponding to the rear wheels are maintained closed (area E).

When the braking forces of the front wheel-hydraulic brakes 19 and 20 reach the driver-requested brake force $F_{drv}$, the operation of the pump 16 is stopped (area B).

The invention has been described above with reference to the embodiments, but the invention is not limited thereto. For example, the master cylinder sensor hydraulic pressure Pmc detected by the master cylinder hydraulic pressure sensor 5 is used to calculate actual caliper volume V in the above-mentioned embodiment, but the invention is not limited thereto. As long as actual caliper volume V can be calculated, wheel cylinder hydraulic pressure sensors, which detect hydraulic pressure in the wheel cylinders of the front wheel-hydraulic brakes 19 and 20, may be provided between the wheel cylinders of the front wheel-hydraulic brakes 19 and 20 and the pressure booster valves 13f and 13f and hydraulic pressure detected by the wheel cylinder hydraulic pressure sensors may be used instead of the master cylinder sensor hydraulic pressure Pmc.

Further, in the above-mentioned embodiments, the brake ECU continuously and gradually increases the openings of the pressure booster valves 13r and 13r corresponding to the rear wheels and then opens the pressure reducing valves 14r and 14r corresponding to the rear wheels when reducing the pressure of the brake fluid that is supplied to the wheel cylinders of the front wheel-hydraulic brakes 19 and 20. However, the invention is not limited thereto. As long as the pressure of the brake fluid supplied to the wheel cylinders of the front wheel-hydraulic brakes 19 and 20 can be continuously and gradually reduced, the openings of the pressure booster valves 13r and 13r corresponding to the rear wheels may be increased after the pressure reducing valves 14r and 14r corresponding to the rear wheels are opened.

The invention is not limited to a four-wheeled vehicle only, and is widely applied to vehicles including a two-wheeled vehicle. Particularly, the invention can be widely applied to a vehicle brake device including a so-called regenerative cooperative brake.

REFERENCE SIGNS LIST

1: brake pedal
2: stroke sensor
3: booster
4: master cylinder
P1, P2: hydraulic pressure port
MC1, MC2: brake pipe line
5: master cylinder hydraulic pressure sensor
6: wheel cylinder hydraulic pressure sensor
10: hydraulic circuit
11: circuit control valve
12: inlet valve
13f: pressure booster valve
13r: pressure booster valve (regulating valve)
14f: pressure reducing valve
14r: pressure reducing valve
15: pump motor
16: pump
17: low pressure accumulator
18: left rear wheel-hydraulic brake (second hydraulic brake)
19: right front wheel-hydraulic brake (first hydraulic brake)
20: left front wheel-hydraulic brake (first hydraulic brake)
21: right rear wheel-hydraulic brake (second hydraulic brake)

What is claimed is:

1. A method of controlling a vehicle brake device that includes first and second hydraulic brakes having respective first and second wheel cylinders, a regenerative brake, a regulating valve provided between a master cylinder and one of the first and second hydraulic brakes, and a pair of pressure reducing valves including a first pressure reducing valve adjacent the first wheel cylinder and a second pressure reducing valve adjacent the second wheel cylinder, the method comprising:
applying a hydraulic brake force at the first hydraulic brake with the first wheel cylinder in response to a braking request;
applying a regenerative brake force with the regenerative brake in response to the braking request; and
reducing the hydraulic brake force at the first hydraulic brake during the application of the regenerative brake force by holding open the second pressure reducing valve while simultaneously controlling a gradual and continuous increasing of an opening of the regulating valve.

2. The method according to claim 1, further comprising supplying a path for brake fluid from the first hydraulic brake, past the second hydraulic brake, to the second pressure reducing valve without generating a braking force at the second hydraulic brake during the reduction of the hydraulic brake force at the first hydraulic brake.

3. The method according to claim 1, wherein each of the first and second pressure reducing valves is a solenoid valve that can only be fully opened or fully closed, and the first pressure reducing valve is maintained fully closed during the reduction of the hydraulic brake force at the first hydraulic brake.

4. The method according to claim 3, wherein the fully closed first pressure reducing valve operates to block a direct path from the first hydraulic brake to an accumulator during the reduction of the hydraulic brake force at the first hydraulic brake.

5. The method according to claim 1, further comprising supplying a path for brake fluid from the first hydraulic brake, through the regulating valve, past the second hydraulic brake, through the second pressure reducing valve, and to an accumulator.

6. The method according to claim 1, wherein the regenerative brake force and the hydraulic brake force are applied to a common wheel of the vehicle, and the regenerative brake force is increased during the reduction of the hydraulic brake force at the first hydraulic brake.

* * * * *